United States Patent [19]
Iida et al.

[11] Patent Number: 6,156,698
[45] Date of Patent: Dec. 5, 2000

[54] HONEYCOMB CATALYST AND MANUFACTURING METHOD THEREFOR

[75] Inventors: Kozo Iida; Shigeru Nojima, both of Hiroshima; Yoshiaki Obayashi, Nagasaki; Atsushi Morii, Nagasaki; Osamu Naito, Nagasaki, all of Japan

[73] Assignee: Mitsubishi Heavy Industries, Ltd., Tokyo, Japan

[21] Appl. No.: 09/067,631

[22] Filed: Apr. 28, 1998

[30] Foreign Application Priority Data

Jun. 6, 1997 [JP] Japan ................................ 9-149144

[51] Int. Cl.⁷ ............................................ B01J 21/04
[52] U.S. Cl. ............... 502/439; 502/527.18; 502/527.19; 428/188; 428/592
[58] Field of Search ............... 502/439, 527.18, 502/527.19; 428/188, 592

[56] References Cited

U.S. PATENT DOCUMENTS

| | | | |
|---|---|---|---|
| 4,349,450 | 9/1982 | Hunter | 502/527.18 |
| 4,404,007 | 9/1983 | Tukao et al. | 55/523 |
| 4,869,944 | 9/1989 | Harada et al. | 428/116 |
| 5,093,178 | 3/1992 | Sundsrom et al. | 428/156 |
| 5,219,667 | 6/1993 | Hampton | 428/593 |
| 5,629,067 | 5/1997 | Kotani et al. | 428/116 |
| 5,716,899 | 2/1998 | Guile et al. | 502/439 |
| 5,821,194 | 10/1998 | In | 502/439 |
| 5,846,899 | 12/1998 | Kumazawa et al. | 502/439 |

FOREIGN PATENT DOCUMENTS

| | | | |
|---|---|---|---|
| 1260909 | 9/1989 | Canada | B01D 53/36 |
| 0 250 166 A2 | 12/1987 | European Pat. Off. | B28B 3/20 |
| 0 283 224 A1 | 9/1988 | European Pat. Off. | B01D 53/36 |
| 0 410 694 A2 | 1/1991 | European Pat. Off. | C04B 35/00 |
| 0 410 694 A3 | 1/1991 | European Pat. Off. | C04B 35/00 |
| 0 761 279 A2 | 3/1997 | European Pat. Off. | B01D 39/20 |
| 0 761 279 A3 | 3/1997 | European Pat. Off. | B01D 39/20 |

OTHER PUBLICATIONS

European Search Report of corresponding European Patent Application No. 98108150.8; dated Mar. 1, 1999.

*Primary Examiner*—Tom Dunn
*Attorney, Agent, or Firm*—Myers Bigel Sibley & Sajovec

[57] ABSTRACT

There are provided a honeycomb catalyst in which irregularities are formed on a catalyst inside wall in a honeycomb hole, and a manufacturing method for a honeycomb catalyst by using an extrusion molding method, in which extrusion molding is effected by using a mold having a means for providing irregularities to a catalyst inside wall of a honeycomb hole.

3 Claims, 5 Drawing Sheets

HONEYCOMB CATALYST AND MANUFACTURING METHOD THEREFOR

BACKGROUND OF THE INVENTION

1. Field of the Invention

The present invention relates to a honeycomb catalyst and a manufacturing method therefor and, more particularly, to a honeycomb catalyst having an improved gas contact efficiency and a manufacturing method therefor.

2. Description of Related Art

Honeycomb catalysts having a grid-like or beehive-like opening have widely been used as catalysts for reaction with various gases such as NOx removal catalysts for boiler exhaust gas and gas turbine exhaust gas of various fuels or catalysts for treating automotive exhaust gas because they can maintain a low pressure loss when gas flows through and comes into contact with the catalyst and because clogging can be avoided in treatment of gas containing dust.

The honeycomb catalyst used here is conventionally manufactured as follows: For example, for an NOx removal catalyst, a solution of compound of V, Mo, W, etc., which are active components, an organic binder, and an inorganic binder are mixed with $TiO_2$ powder, which is a catalyst raw material, and the mixture is kneaded into a clay-like substance, and then a molded product having a grid-like opening is obtained by using an extrusion molding machine provided with a mold 10, for example, as shown in FIGS. 7 and 8. FIG. 7 is a front view, and FIG. 8 is a sectional view taken along the line VIII—VIII of FIG. 7. The clay-like substance containing a catalyst component passes through a clay-like substance passing hole 12 from B side toward C side in FIG. 8 and is pushed out from a gap of a honeycomb-shaped mouthpiece tip end 11 to yield a honeycomb product having square openings. Reference numeral 13 in FIGS. 7, 8 denotes a bolt hole for attaching a mouthpiece 10 to an extruder, and 14 denotes a bolt hole for attaching a die forming an external frame.

Although the honeycomb catalyst has excellent structural features as described above, a honeycomb catalyst which has an improved gas contact efficiency has been demanded to carry out gas reaction or gas treatment more efficiently.

SUMMARY OF THE INVENTION

The present invention was made in view of the above situation, and accordingly an object thereof is to provide a honeycomb catalyst having an improved gas contact efficiency and a manufacturing method therefor.

To solve the above problem, the inventors intensively studied the rate of a reaction using a honeycomb catalyst. As a result, it was found that the important factors are the gas contact area per unit volume of catalyst and the travel velocity of reaction substance to the honeycomb wall surface, and in order to achieve the catalyst performance effectively, the increase in contact area and the increase in travel velocity of reaction substance to the wall surface achieved by making the gas flow in the honeycomb hole turbulent are effective, with the result that the present invention was completed.

Thereupon, the present invention provides a honeycomb catalyst in which irregularities are formed on a catalyst inside wall in a honeycomb hole.

Also, as another aspect of the present invention, there is provided a manufacturing method for a honeycomb catalyst by using an extrusion molding method, in which extrusion molding is effected by using a mold having a means for providing irregularities to a catalyst inside wall of a honeycomb hole.

As an embodiment of the present invention, a means for providing irregularities to a catalyst inside wall of a honeycomb hole is configured so that rollers formed with irregularities with a proper pitch on the surface are mounted on a mouthpiece at the tip end of the mold.

As an embodiment of the present invention, a means for providing irregularities to a catalyst inside wall of a honeycomb hole is configured so that oscillators oscillating with a constant period are attached to a mouthpiece at the tip end of the mold.

As an embodiment of the present invention, a means for providing irregularities to a catalyst inside wall of a honeycomb hole is configured so that auxiliary plates having indentations at the edge are attached to a mouthpiece at the tip end of the mold.

The honeycomb catalyst in accordance with the present invention can widely be used as a catalyst for reaction with various gases such as an NOx removal catalyst for boiler exhaust gas and gas turbine exhaust gas of various fuels or a catalyst for treating automotive exhaust gas. In particular, it is useful as a catalyst used in the field of the reduction removal of nitrogen oxides contained in a combustion exhaust gas or the removal of unburned carbon monoxide and hydrocarbon.

The honeycomb catalyst in accordance with the present invention, in which irregularities are formed on a catalyst inside wall in a honeycomb hole, has a large contact area with which the gas flowing in the hole comes into contact, has an effect of making the gas flow turbulent in the hole, offers a higher contact efficiency between the catalyst and the reaction gas than the conventional honeycomb catalyst, exhibiting a high catalyst performance.

Also, according to the method in accordance with the present invention for extrusion molding by using a mold having a means for providing irregularities to a catalyst inside wall of a honeycomb hole, irregularities are formed on the catalyst inside wall, and a honeycomb catalyst having an improved catalyst performance can be manufactured easily.

DETAILED DESCRIPTION OF THE PREFERRED EMBODIMENTS

Figure 6:
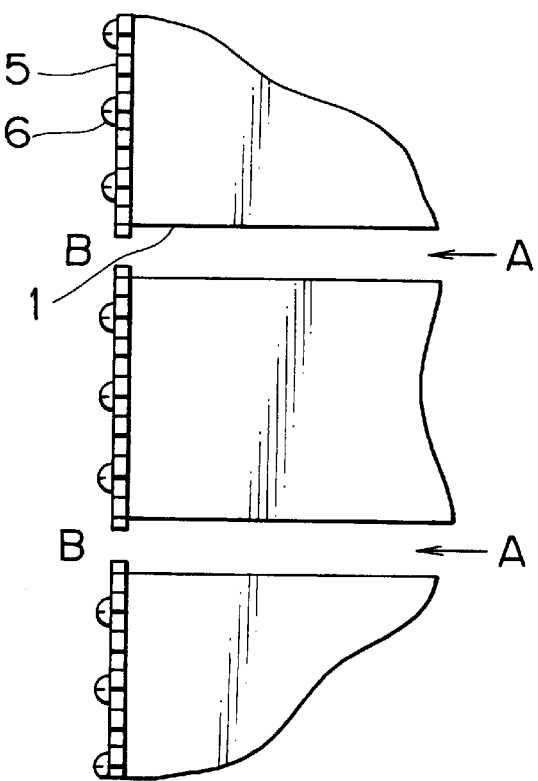
FIG. 6 is a side view enlargedly showing a part of the tip end of still another example of a mold used for manufacturing a catalyst in accordance with the present invention.
Figure 7:
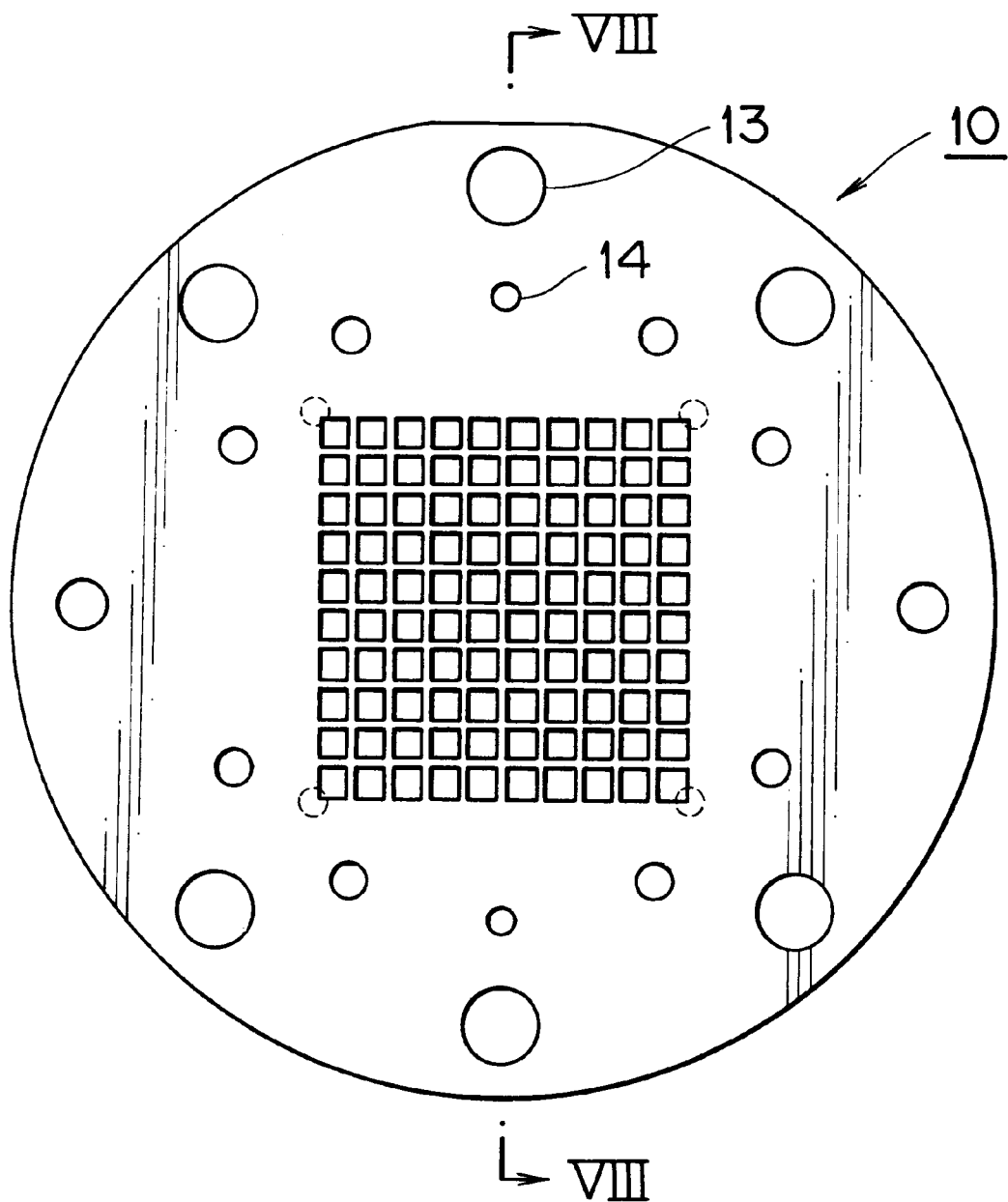
FIG. 7 is a front view showing an example of a conventional mold for extrusion molding a honeycomb catalyst.
Figure 8:
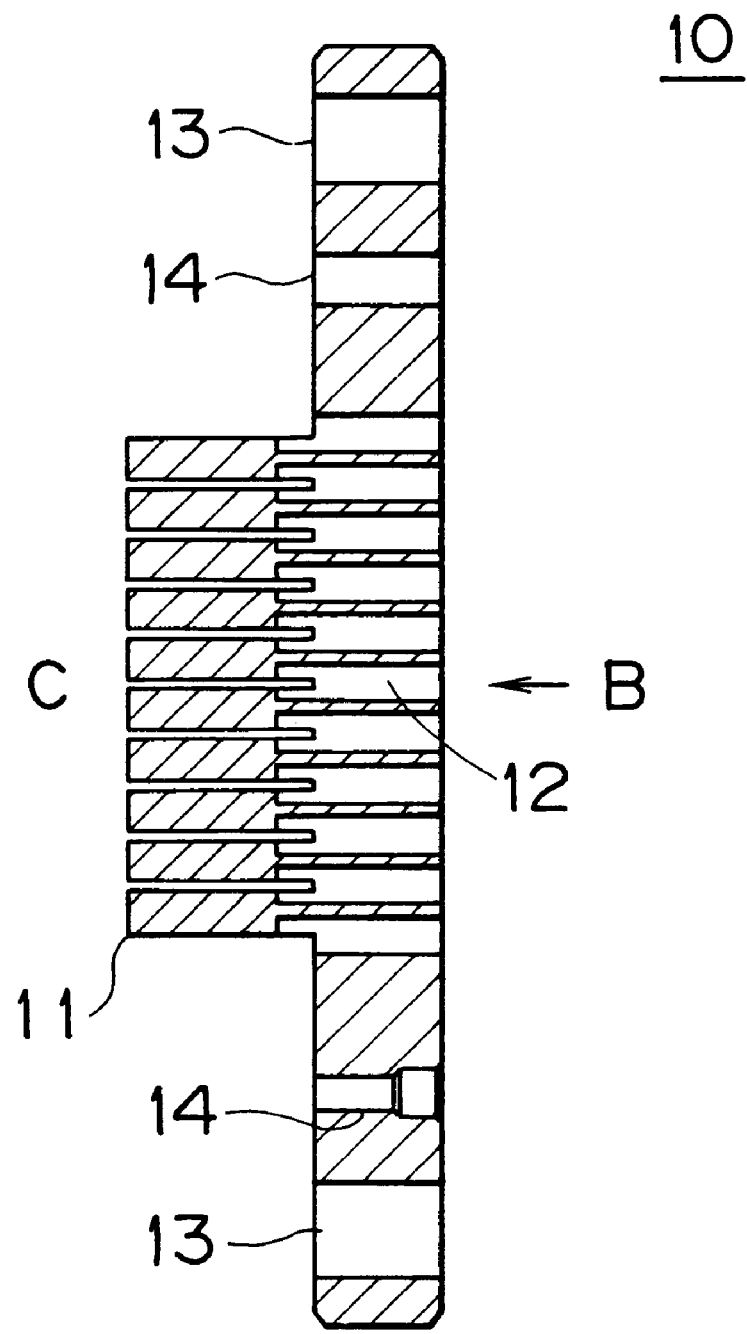
FIG. 8 is a sectional view taken along the line VIII—VIII of FIG. 7, showing an example of a conventional mold for extrusion molding a honeycomb catalyst.

A honeycomb catalyst molded by using a conventional mold as shown in FIGS. 7 and 8 has a smooth wall surface in the honeycomb hole thereof. Therefore, the gas which is brought into contact with the catalyst usually passes through the honeycomb holes without the turbulence of flow. To the contrary, for the honeycomb catalyst of the present invention, irregularities (unevenness) are formed on the catalyst inside wall in the honeycomb hole thereof, so that the gas contact area per unit volume of the molded catalyst increases, by which the performance as a catalyst is improved. In particular, when the irregularities are formed so that the cross-sectional area of gas flow path changes in the gas travel direction as in the honeycomb catalyst molded by using a later-described mold shown in FIGS. 1 to 6, the turbulence of gas flow in the honeycomb hole increases, leading to an increase in travel velocity of reaction substance on the gas boundary film, so that the catalyst performance increasing effect is increased.

The honeycomb catalyst in accordance with the present invention, in which irregularities are formed on the catalyst inside wall in the honeycomb hole, can be manufactured by kneading a catalyst constituent raw material with a molding auxiliary, binder component, etc. and by extrusion molding the extrusion raw material (kneaded substance) capable of being extrusion molded by using a mold having a means for providing irregularities to the catalyst inside wall in the honeycomb hole. The present invention will be described in more detail with reference to the accompanying drawings.

Figure 1:
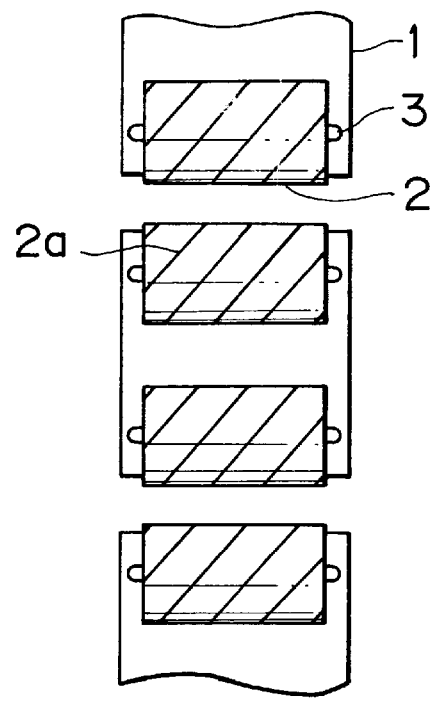
FIG. 1 is a front view enlargedly showing a part of the tip end of an example of a mold used for manufacturing a catalyst in accordance with the present invention.
Figure 2:
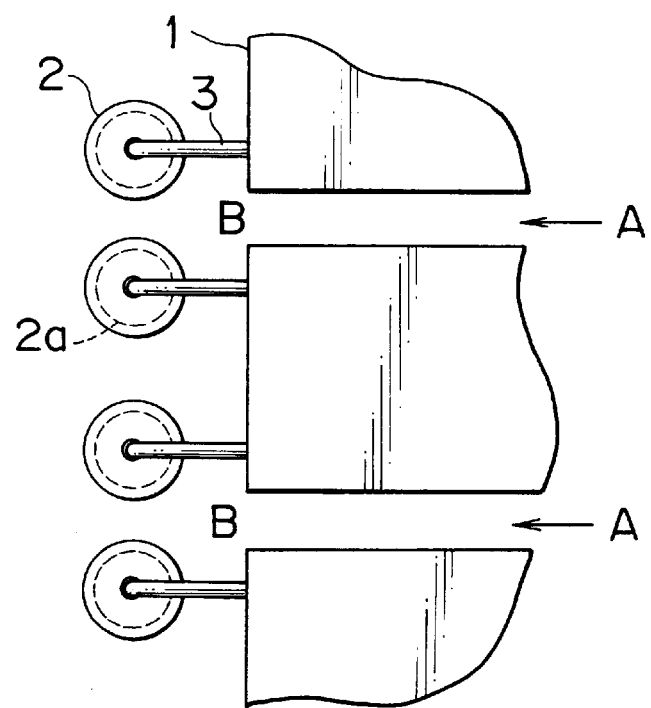
FIG. 2 is a side view enlargedly showing a part of the tip end of an example of a mold used for manufacturing a catalyst in accordance with the present invention.

FIGS. 1 and 2 are views enlargedly showing a part of the tip end of an example of a mold used for manufacturing a catalyst in accordance with the present invention. FIG. 1 is a front view, and FIG. 2 is a side view. In the mold shown in FIGS. 1 and 2, rollers 2 formed with irregularities 2a with a proper pitch on the surface are mounted on a mouthpiece 1 at the tip end of the mold via a roller support 3. The kneaded substance extruded from the direction of A in FIG. 2 comes into contact with the roller 2 at an outlet B, so that irregularities corresponding to the irregularities 2a formed on the surface of the roller 2 are formed on the inside wall of the hole of molded catalyst as the roller 2 rotates.

Figure 3:
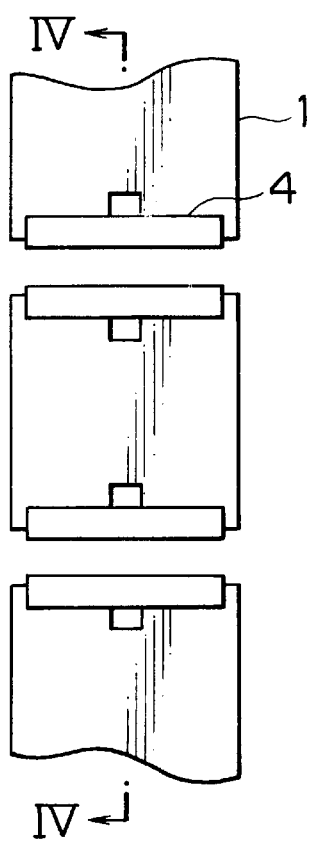
FIG. 3 is a front view enlargedly showing a part of the tip end of another example of a mold used for manufacturing a catalyst in accordance with the present invention.
Figure 4:
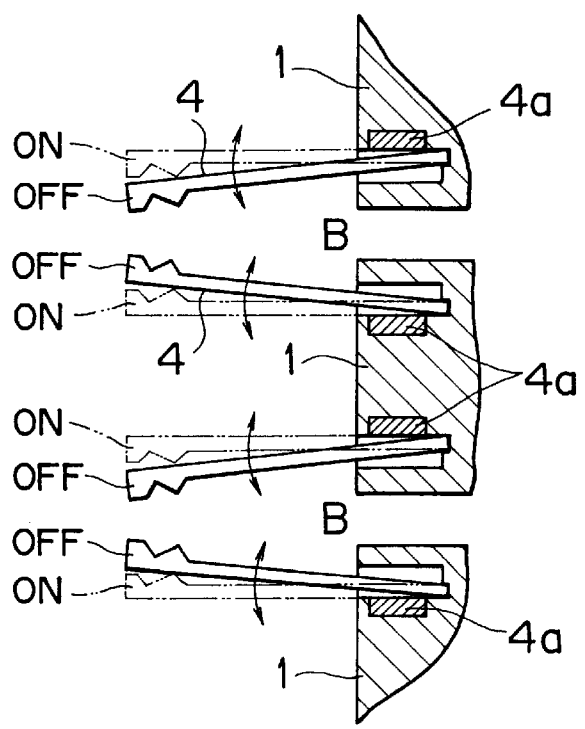
FIG. 4 is a sectional view taken along the line IV—IV of FIG. 3, enlargedly showing a part of the tip end of another example of a mold used for manufacturing a catalyst in accordance with the present invention.

FIGS. 3 and 4 are views enlargedly showing a part of the tip end of another example of a mold used for manufacturing a catalyst in accordance with the present invention. FIG. 3 is a front view, and FIG. 4 is a sectional view taken along the line IV—IV of FIG. 3. In the mold shown in FIGS. 3 and 4, oscillators 4 which oscillate with a constant period are attached to a mouthpiece 1 at the tip end of the mold. The oscillator 4 comes into contact with and is pressed on the kneaded substance extruded from the direction of A in the figure at an outlet B, so that irregularities are formed on the inside wall of the hole of molded catalyst.

In this case, as shown in FIG. 4, the oscillator 4 is attracted by a magnetic force and is returned by a return spring (not shown), for example, by turning on and off the current flowing in an electromagnet 4a, whereby the oscillator 4 can be oscillated.

Figure 5:
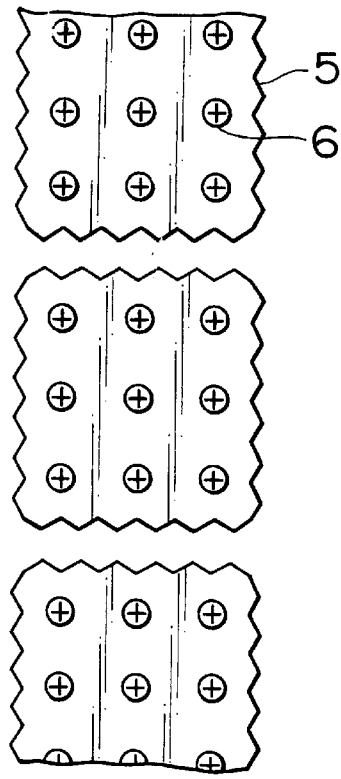
FIG. 5 is a front view enlargedly showing a part of the tip end of still another example of a mold used for manufacturing a catalyst in accordance with the present invention.

FIGS. 5 and 6 are views enlargedly showing a part of the tip end of still another example of a mold used for manufacturing a catalyst in accordance with the present invention. FIG. 5 is a front view, and FIG. 6 is a side view. In the mold shown in FIGS. 5 and 6, auxiliary plates 5 having indentations at the edge are attached to a mouthpiece 1 at the tip end of the mold so that the cross-sectional shape of the mouthpiece 1 is corrected by the auxiliary plates 5. The kneaded substance extruded from the direction of A in FIG. 6 is extruded into a cross-sectional shape corresponding to the shape of the auxiliary plate 5 from the outlet B so that irregularities parallel to the gas flow direction are formed on the inside wall of the hole of molded catalyst. Reference numeral 6 in FIGS. 5 and 6 denotes a screw for attaching the auxiliary plate 5 to the tip end of the mouthpiece 1.

Other portions of the molds shown in FIGS. 1 to 6 can be configured in the same way as the mold shown in FIGS. 7 and 8 or other publicly-known molds. Also, as the configuration of other portions of an apparatus using such a mold, an apparatus which is publicly known to a person skilled in the art can be used.

The entire disclosure of Japanese Patent Application No. 9-149144 filed on Jun. 6, 1997 including the specification, the claims, the drawings and the summary are incorporated herein by reference in its entirety.

What is claimed is:

1. A honeycomb catalyst produced by the method comprising extruding a kneaded substance in a mold to form a catalyst having a hole with an inside wall, wherein the inside wall comes in contact with a tip at the end of the mold having rollers containing irregularities thereon in such a manner that irregularities on the inside wall of the catalyst are formed which corresponds to the irregularities on the rollers.

2. A honeycomb catalyst produced by the method comprising extruding a kneaded substance in a mold to form a catalyst having a hole with an inside wall, wherein the inside wall comes in contact with a tip at the end of the mold having oscillators present thereon in such a manner that irregularities on the inside wall of the catalyst are formed by virtue of contacting the oscillators in motion.

3. A honeycomb catalyst produced by the method comprising providing a mold having a tip at the end of the mold, the tip having at least one auxiliary plate with at least one edge present thereon and wherein indentations are present at the edge, and wherein the mold has a cross-section with a shape corresponding to the shape of the auxiliary plate, and extruding a kneaded substance in the mold to form a catalyst having a hole with an inside wall, wherein the inside wall comes in contact with the indentations present on the auxiliary plate in a manner such that irregularities on the inside wall of the catalyst are formed thereon which correspond to the indentations.

* * * * *